US011086145B2

(12) United States Patent
Flinders (10) Patent No.: US 11,086,145 B2
(45) Date of Patent: Aug. 10, 2021

(54) EYEWEAR AND LENSES THEREFOR (71) Applicant: Matthew Flinders, Charlestown, MA (US)

(72) Inventor: Matthew Flinders, Charlestown, MA (US)

(*) Notice: Subject to any disclaimer, the term of this patent is extended or adjusted under 35 U.S.C. 154(b) by 0 days.

(21) Appl. No.: 14/775,670

(22) PCT Filed: Mar. 14, 2014

(86) PCT No.: PCT/US2014/029796
§ 371 (c)(1),
(2) Date: Sep. 12, 2015

(87) PCT Pub. No.: WO2014/145111
PCT Pub. Date: Sep. 18, 2014

(65) Prior Publication Data
US 2016/0026005 A1 Jan. 28, 2016

Related U.S. Application Data (60) Provisional application No. 61/786,756, filed on Mar. 15, 2013.

(51) Int. Cl.
*G02C 7/10* (2006.01)
*G02C 7/12* (2006.01)
*G02B 5/22* (2006.01)

(52) U.S. Cl.
CPC ............... *G02C 7/104* (2013.01); *G02B 5/22* (2013.01); *G02C 7/10* (2013.01); *G02C 7/105* (2013.01); *G02C 7/12* (2013.01)

(58) Field of Classification Search
CPC . G02C 7/10; G02C 7/12; G02C 7/104; G02C 7/105; G02B 5/22
See application file for complete search history.

(56) References Cited

U.S. PATENT DOCUMENTS

| 4,989,967 A | 2/1991 | Matsuda |
|---|---|---|
| 5,083,858 A | 1/1992 | Girerd |
| 5,400,175 A | 3/1995 | Johansen et al. |

(Continued)

FOREIGN PATENT DOCUMENTS

| BE | 10108173 A3 | 6/2010 |
|---|---|---|
| EP | 2772794 A1 | 9/2014 |

(Continued)

OTHER PUBLICATIONS

Extended EPO Search Report dated Dec. 20, 2016, EP App. No. 14762840.8.

(Continued)

*Primary Examiner* — Jack Dinh
(74) *Attorney, Agent, or Firm* — Matthew Flinders (57) ABSTRACT

The invention relates to eyewear and lenses for controlling and/or blocking the absorption of particular bandwidths of light that can impact the physiology of the wearer. The eyewear lens is adapted to selectively permit the relatively greatest percentage of a light within a wavelength range of between about 400 and 490 nanometers. The eyewear lens selectively permits the passage of light of the given wavelength range over one or more subregions of the eyewear lens. The one or more subregions cover in total at most 25-50% of the lens. The peak transmission level within the range between about 400 and 490 nanometers is at least about 70% and the passage of light outside of the range between about 400 and 490 nanometers is less than about 70%.

18 Claims, 6 Drawing Sheets

(56) References Cited

U.S. PATENT DOCUMENTS

| | | |
|---|---|---|
| 6,893,127 B2 | 5/2005 | Reichow et al. |
| 7,688,431 B1 | 3/2010 | Balch et al. |
| 2004/0119940 A1 | 6/2004 | Kerns et al. |
| 2009/0204186 A1 | 8/2009 | Gruber |
| 2010/0066974 A1 | 3/2010 | Croft et al. |
| 2010/0277687 A1 | 11/2010 | Shehadeh et al. |
| 2011/0085127 A1 | 4/2011 | Wada |
| 2013/0114036 A1 | 5/2013 | Pritts |

FOREIGN PATENT DOCUMENTS

| | | |
|---|---|---|
| WO | 2012044256 A1 | 4/2012 |
| WO | 2012177296 A1 | 12/2012 |

EYEWEAR AND LENSES THEREFOR

CROSS REFERENCE TO RELATED APPLICATIONS

The present application represents the national stage entry of PCT International Application No. PCT/US2014/29796 filed Mar. 14, 2015 and relates to and claims priority from U.S. Provisional Application No. 61/786,756 filed Mar. 15, 2013, the entire disclosure of which is herein incorporated by reference.

BACKGROUND OF THE INVENTION

1. Field of the Invention

Embodiments of the present inventive concepts are directed to eyewear and lenses for use in eyewear. More particularly, present inventive concepts relate to eyewear and lenses for controlling and/or blocking the absorption of particular bandwidths of light that can impact the physiology of the wearer.

2. Description of the Related Art

Knowledge about how light effects the physiology of humans has significantly increased recently. Exposure to adequate amounts of natural light, including to the eye, can be important to biological rhythms, alertness, and mood. However, natural light, particularly in excessive amounts, can be harmful both to the eyes and skin.

Obtaining inadequate amounts of light within the right spectrum has been shown to decrease alertness and worsen mood within some subjects. It is believed this results from the effect of particular bandwidths of light in suppressing melatonin and increasing the photochemical production of vitamin D. These effects are particularly connected to the interaction of this light with certain optical nerves and the pineal gland, which produces melatonin. Experiments and studies involving melatonin have shown that excessive amounts of melatonin causes drowsiness and can increase feelings of depression (A. J. Lewy et al., The Neurohormone Melatonin as a Marker, Medicament, and Mediator, Brain and Behavior (Second Edition), Academic Press, San Diego, 2009, Pages 2505-2528). Studies have also shown that the eye is most sensitive to these interactions within the wavelengths of between about 400 nm and 500 nm (J. J. Gooley, et al., "Spectral Responses of the Human Circadian System Depend on the Irradiance and Duration of Exposure to Light", Science Translational Medicine 2 (31): 31-33).

Numerous devices have recently been proposed to generate artificial light to mimic and enhance particular wavelengths identified with regulating these physiological functions. Various devices are described in U.S. Patent Application Publication Nos. 2003/0069616 A1 by Skene et al., 2012/0095534 A1 by Schlangen et al., and 2012/0041520 A1 by Colbaugh et al., the contents of each of which is herein incorporated by reference in its entirety. Such devices, however, can be excessively bright, costly, time consuming, and inconvenient to use on a regular basis. Also, when spending time outdoors in beneficial sunlight, our pupils tend to close, thus limiting the amount of beneficial mood-regulating light that reaches our system. Further, traditional eye-protecting sunglasses used in bright sunlight block those mood-regulating spectra. Thus, more convenient and adaptable methods for obtaining the desired bandwidths of light are needed.

SUMMARY OF THE INVENTION

The eyewear and components thereof described in the present specification are designed to provide enhanced absorption to the wearer of light for regulating mood and biological rhythms. The components include lenses designed to enhance the absorption of particular wavelengths and for directing this absorption in particular areas of the eye. Various implementations are easy to wear, require no internal power sources, and also provide manufacturability and relatively low-cost production requirements.

In an aspect of inventive concepts, an eyewear lens is adapted to selectively permit a predominant passage of a light across a wavelength range between about 400 and 490 nanometers. In an embodiment, the eyewear lens is adapted to selectively permit a predominant passage of light at a peak wavelength of about 470 nanometers. In an embodiment, the eyewear lens of claim 1 comprising a bandpass filter which permits the predominant passage of light across a wavelength range between about 400 and 490 nanometers.

In an embodiment, the eyewear lens is adapted to permit the predominant passage of light across a wavelength range between about 400 and 490 nanometers selectively over one or more subregions of the eyewear lens. In an embodiment, the one or more subregions are limited to subregions about the frame edge of the eyewear lens. In an embodiment, the one or more subregions are limited to at least one or more of the leftmost portion of a left side lens, the rightmost portion of a right side lens, and the topside portion of the eyewear lens. In an embodiment, the one or more subregions cover in total at most 25% of the lens. In an embodiment, the one or more subregions cover in total at most 50% of the lens.

In an embodiment, the eyewear lens is polarized.

In an embodiment, the eyewear lens has a peak transmission level within the range between about 400 and 490 nanometers of at least about 70% and the passage of light outside of the range between about 400 and 490 nanometers is less than about 70%. In an embodiment, the eyewear lens has a transmission level within the range between about 400 and 490 nanometers of at least about 80%. In an embodiment, the peak transmission level of the passage of light outside of the range between about 400 and 490 nanometers is less than about 50%. In an embodiment, the peak transmission level of the passage of light outside of the range between about 400 and 490 nanometers is less than about 50% of the peak transmission level of the passage of light within the range between about 400 and 490 nanometers.

In an embodiment, the peak transmission level of the passage of light within the range of about 380 nm and less than about 380 nm is about 0%.

In an aspect of inventive concepts, a pair of eyeglasses is provided including at least one eyewear lens, the at least one eyewear lens adapted to selectively permit a predominant passage of a light across a wavelength range between about 400 and 490 nanometers through one or more subregions of the eyewear lens located adjacent the leftmost side of a left side lens and a rightmost side of a right side lens, and wherein the one or more subregions cover in total at most 50% of the lens surface.

In an embodiment, the one or more subregions cover in total at most 30% of the lens surface.

In an embodiment, the eyewear is arranged so that about 100% of light entering the eyes of a wearer of the eyeglasses passes through the at least one eyewear lens.

In an aspect of inventive concepts, a pair of eyeglasses is provided including at least one eyewear lens, wherein the lens is arranged and configured to provide a peak transmission level of passing light outside of the range between about 400 and 490 nanometers that is less than the peak transmission level of passing light within the range between about 400 and 490 nanometers.

In an embodiment, the peak transmission level through the at least one lens of light outside of the range between about 400 and 490 nanometers is less than 50% of the peak transmission level through the lens of light within the range between about 400 and 490 nanometers.

In an embodiment, the pair of eyeglasses is configured and arranged so that the transmission levels are adapted to provide at least 200 lux of luminance of light within the range of 400 and 490 nanometers when used in bright sunlight.

In an aspect of inventive concepts, an eyewear lens is adapted to selectively permit the greatest relative percentages of a light within a wavelength range of between about 400 and 490 nanometers. In an embodiment, the eyewear lens is adapted to selectively permit the greatest relative passage of light at a peak wavelength of about 470 nanometers. In an embodiment, the eyewear lens includes a bandpass filter which selectively permits a relatively greater percentage light within a wavelength range between about 400 and 490 nanometers than wavelengths outside of wavelengths between about 400 and 490 nanometers. In an embodiment, the eyewear lens is adapted to selectively permit passage of a relatively greater percentage of light within a wavelength range between about 400 and 490 nanometers selectively over one or more subregions of the eyewear lens.

BRIEF DESCRIPTION OF THE DRAWINGS

The foregoing and other objects, features, and advantages of the invention will be apparent from the more particular description of preferred embodiments of the invention, as illustrated in the accompanying drawings in which like reference characters refer to the same parts throughout the different views. The transmission profiles represent optimal curves according to the various embodiments. The drawings are not necessarily to scale, emphasis instead being placed upon illustrating the principles of the invention.

DETAILED DESCRIPTION OF EMBODIMENTS OF THE INVENTION

The accompanying drawings are described below, in which example embodiments in accordance with the present invention are shown. Specific structural and functional details disclosed herein are merely representative. This invention may be embodied in many alternate forms and should not be construed as limited to example embodiments set forth herein.

Accordingly, specific embodiments are shown by way of example in the drawings. It should be understood, however, that there is no intent to limit the invention to the particular forms disclosed, but on the contrary, the invention is to cover all modifications, equivalents, and alternatives falling within the spirit and scope of the claims. Like numbers refer to like elements throughout the description of the figures.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "on," "connected to" or "coupled to" another element, it can be directly on, connected to or coupled to the other element or intervening elements may be present. In contrast, when an element is referred to as being "directly on," "directly connected to" or "directly coupled to" another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprise," "comprises," "comprising," "include," "includes" and/or "including," when used herein, specify the presence of stated features, integers, steps, operations, elements, and/or components, but do not preclude the presence or addition of one or more other features, integers, steps, operations, elements, components, and/or groups thereof.

It will be further understood that a "lens" can be a focusing (i.e., prescriptive/corrective) or non-focusing lens and may or may not otherwise significantly redirect light.

It will be further understood that "transmission level" or "transmission" may represent the relative amount or the percentage of light allowed to pass through a translucent or transparent medium.

It will be further understood that "cover," when used with respect to a lens, can mean over or adjacent to a lens surface, including a portion thereof.

Figure 1A:
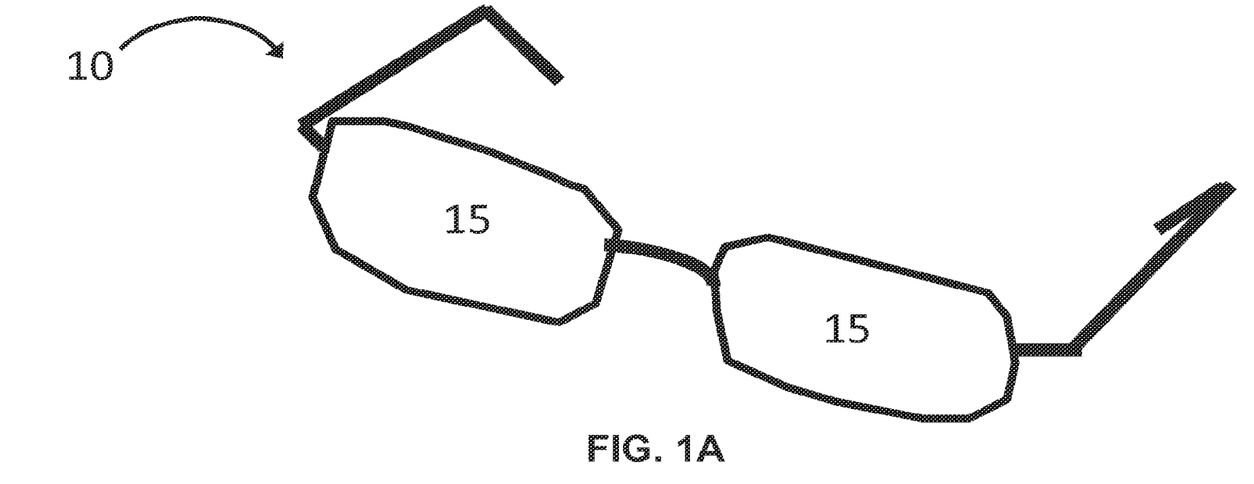
FIG. 1A is an illustrative perspective view of eyeglasses with lenses according to an embodiment of inventive concepts.
Figure 1B:
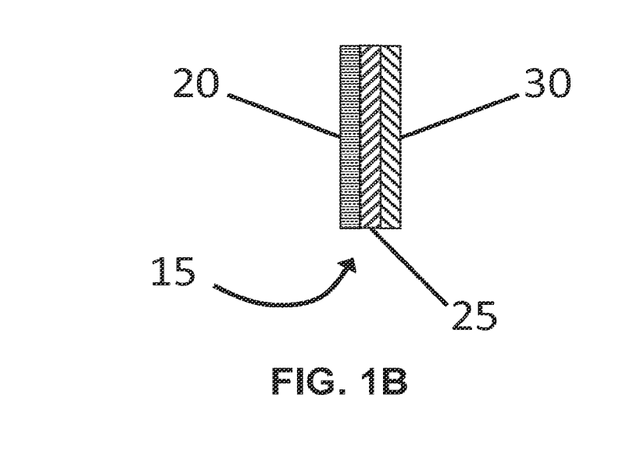
FIG. 1B is an illustrative cross-sectional schematic of a lens according to an embodiment of inventive concepts.

FIG. 1A is an illustrative perspective view of eyeglasses 10 with lenses 15 according to an embodiment of inventive concepts. FIG. 1B is an illustrative cross-sectional schematic of layers of the lens 15 according to an embodiment of inventive concepts. In an embodiment lenses 15 are crafted to accentuate the transmission/passage through the lenses of light associated with mood and sleep regulation when absorbed through the eye. In an embodiment, a relatively greater amount of a band of wavelengths is permitted to pass (or transmit) through the lens, and can be between about 400 and 520 nanometers, between about 400 and 470 nanometers, between about 420 and 470 nanometers, between about 460 and 485 nanometers and, in an embodiment, having a peak wavelength of about 470 nanometers. In an embodiment, the lenses are crafted with a primary lens 25 and one or more layers (e.g., layers 20 and 30) so as to allow the passage of the desired wavelengths in the desired levels and/or provide other optical effects. In various embodiments, up to six or more layers can be employed such as to produce sharp cutoffs across wavelength regions.

In an embodiment, layers 20 and/or 30 are band pass filters which allow, alone or together, the relatively greater passage or transmission of light in the ranges associated with mood and sleep regulation. In an embodiment, layer 20 provides an external reflective layer (mirror coating) which reflects selective bands of wavelengths such as, for example, those outside of the ranges described above, in order to increase the predominance in the desired ranges. In an embodiment, layers 20 and/or 30 are UV filters, eliminating the passage of light in the UV range, which can be harmful to the eye. In an embodiment, layer 30 is anti-reflective (AR), preventing the back-reflection of light emitted from behind the lens, which can further enhance the predominant absorption by the eye of the prescribed ranges. In an embodiment, the lens comprises a discriminating filter resulting in a rectangular bandpass shape, very steep edges, and very deep blocking. In an embodiment, the lenses 15 are effectively polarized, which can enhance the absorption of the desired wavelengths (e.g., such as those emanating from the sky) and reduce non-useful light reflected off of nearby sources. Materials for the lenses and layers include glass and/or plastic, resins, dyes, and other materials known to crafters of lenses. In an embodiment, fluorescent materials can be employed to further accentuate desired wavelengths. For example, fluorescein is a material which produces an output of about 521 nm. Other examples are provided in U.S. Patent Application Publication No. 2011/0235339 A1 by Shyu et al., which disclose methods of combining various fluorescent materials to obtain a desired effect, the contents of which is herein incorporated by reference in its entirety.

Figure 1C:
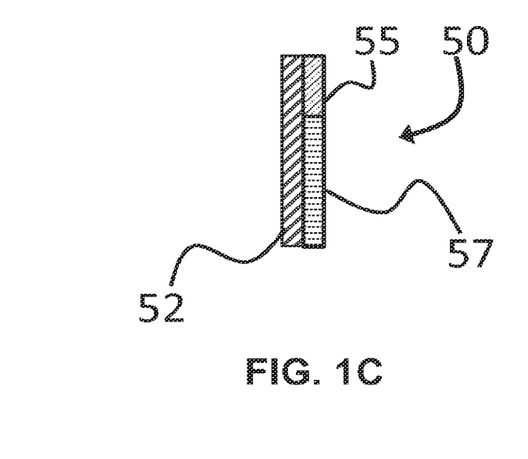
FIG. 1C is another illustrative cross-sectional schematic of a lens according to an embodiment of inventive concepts.

FIG. 1C is another illustrative cross-sectional schematic of a lens 50 according to an embodiment of inventive concepts. It is known that bands of blue light, including light within the ranges described above with respect to regulating mood and sleep, is not ideal for observation and clarity. However, certain portions of the eye, including optical nerves associated with the upper region, the leftmost region of the left eye, and the rightmost region of the right eye are more sensitive to the mood and sleep regulating wavelengths. A primary lens 52 is combined with a filter layer 55 covering the top portion of the lens, creating a cross-section portion that allows a relatively greater passage or transmission level of the desired wavelengths associated with mood and sleep regulation through that portion. A filter layer 57 covers a remaining portion of the lens surface, which provides differing light filtering properties. In an embodiment, the remaining portion operates in a more traditional eye and vision enhancing manner. Various embodiments herein direct predominant passage of the mood and sleep regulating wavelengths (sensitive wavelengths) to the portions of the eye more sensitive to these wavelengths.

Figure 2A:
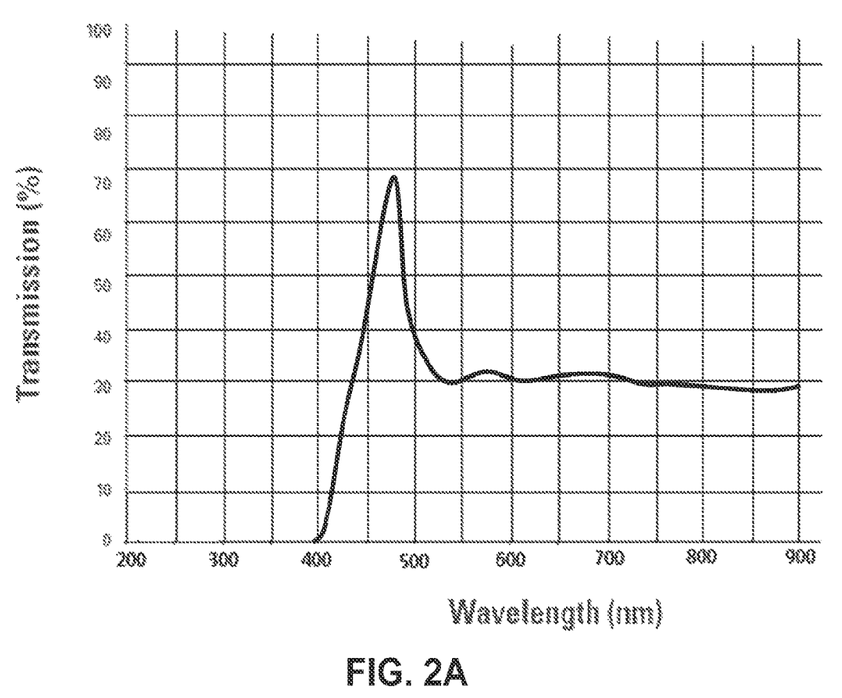
FIG. 2A is a graphical illustration showing a wavelength transmission profile of a lens according to an embodiment of inventive concepts.

FIG. 2A is a graphical illustration showing a wavelength transmission profile of a lens according to an embodiment of inventive concepts. The present embodiment represents a narrow accentuated band of transmission around a peak of about 470 nanometers with the substantial remaining ranges of visible light filtered down to about 30% throughput or transmission level. A substantial portion of light outside of a sensitive wavelength does not impinge the eye, leaving the pupil relatively widely open, and more receptive to the more sensitive highly transmitted wavelength. The present embodiment would concentrate transmission in the 470 band and, in a preferred embodiment, the narrow bandpass filtering is applied to cover a section of a lens such as a top and/or side region such as, for example, illustrated in FIG. 1C and FIGS. 3A-7.

Figure 2B:
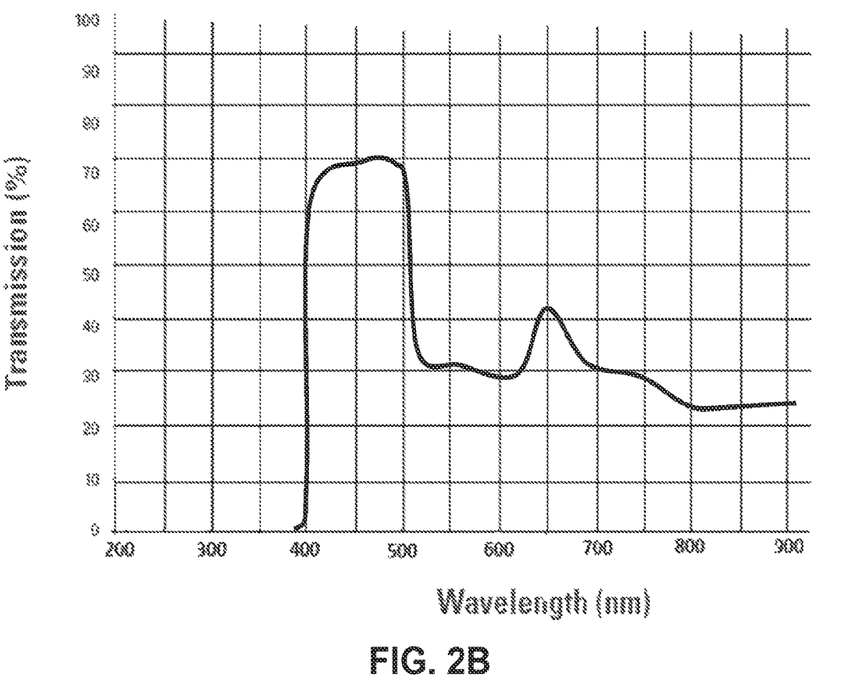
FIG. 2B is a graphical illustration showing another wavelength transmission profile of a lens according to an embodiment of inventive concepts.

FIG. 2B is a graphical illustration showing another wavelength transmission profile of a lens according to an embodiment of inventive concepts. In an embodiment, a wider band between about 400 nm and 500 nm is accentuated, as well as a short band around 650 nm. While the wider band accentuates a wide range of mood and sleep regulating wavelengths, the shorter band moderately accentuates a wavelength which can improve clarity and sharpness. Such a profile, in a preferred embodiment, may be appropriate for application to an entire lens or to a distinct select portion such as described in various embodiments herein.

Figure 2C:
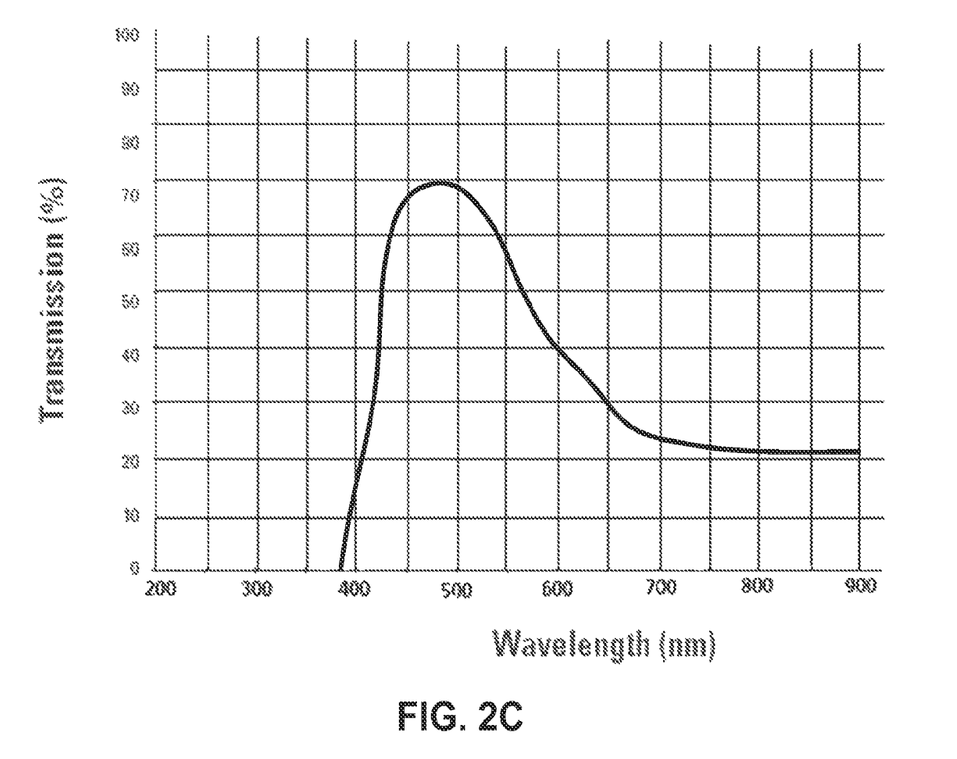
FIG. 2C is a graphical illustration showing another wavelength transmission profile of a lens according to an embodiment of inventive concepts.

FIG. 2C is a graphical illustration showing another wavelength transmission profile of a lens according to an embodiment of inventive concepts. In an embodiment, a wide gradually sloping band peaking about 470 nm may not provide as concentrated a profile of sensitive wavelengths but may be more appropriate for general use, balancing mood/sleep regulation enhancement and clarity, while capable of being more cheaply manufactured in a lens to which the profile is applied entirely. In an embodiment, the lenses are configured to limit the amount of light throughput from sunlight or other source to about 300 lux or less, which provides sufficient power to stimulate the sensitive portions of the eye with the sensitive wavelengths.

In other embodiments, the light profile is adapted to correspond closely to the various light boxes such as those identified in publications incorporated by reference above.

In an embodiment, the wavelength profiles are adapted for different environmental light conditions and/or artificial light sources. For example, in cloudy or low-light conditions, greater percentages of light, both in the stimulating regions and other visible regions, are allowed to pass to the wearer. An embodiment is adapted for conditions including large amounts of white-light-reflecting snow so that more of the highly intense snow-reflected is filtered out while more light in the mood-sensitive regions are allowed to pass.

In an embodiment, the wavelength profiles are adapted for use with an artificial light source such as, for example, those referenced above for regulating mood. For example, in an embodiment, a light transmission profile can be adapted to substantially block all ambient light other than that from a light source providing the mood-regulating bandwidths.

In an embodiment, the wavelength profile is adapted for more traditional artificial light sources including, for example, incandescent, LED, and fluorescent bulbs. Relative to the Sun, incandescent bulbs typically produce greater proportions of light in the longer wavelength regions (e.g., yellow/red) of the visible spectrum as compared to the mood regulating wavelengths. Embodiments are adapted to selectively block these peak regions other than the mood regulating spectra and/or concentrate the mood-regulating spectra to those regions of the eye (e.g. peripheral) optimal for receiving these bandwidths such as with the use of selectively filtering sub-regions of the lenses.

Figure 3A:
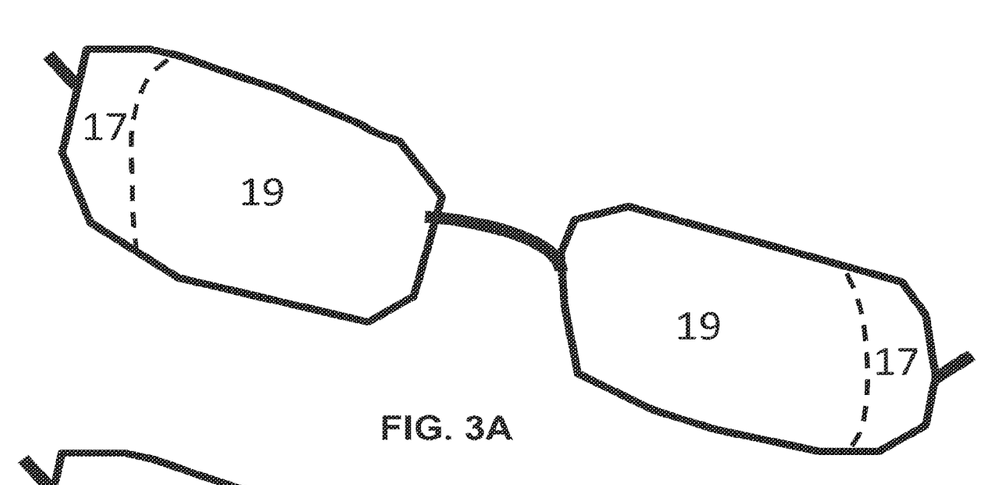
FIG. 3A is an illustrative view of eyeglasses with lenses according to an embodiment of inventive concepts.
Figure 3B:
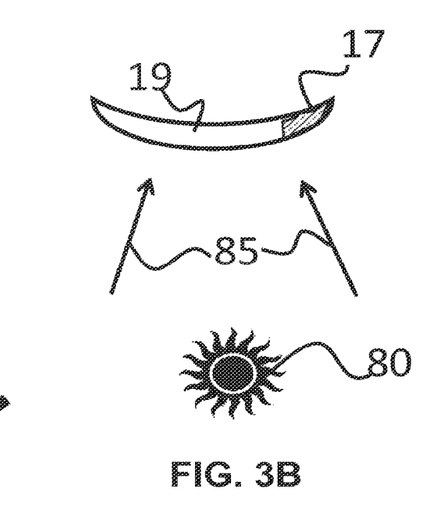
FIG. 3B is an illustrative schematic top perspective view of light directed to a lens according to the embodiment of FIG. 3A.

FIG. 3A is an illustrative view of eyeglasses with lenses according to an embodiment of inventive concepts. FIG. 3B is an illustrative schematic top perspective view of light directed to a lens according to the embodiment of FIG. 3A. In an embodiment, a portion of the lens 17 targets absorption of selected wavelengths in the rightmost portion of the right eye and leftmost portion of the left eye, which can enhance absorption of the sensitive wavelengths in these more sensitive portions of the eye. In an embodiment, a separate portion 19 can be configured to pass wavelengths in a more traditional vision-enhancing manner and more significantly promote clarity and sharpness of vision. Exemplary light traces 85 emanating from surroundings, including the sky within which the sun 80 and atmosphere generate a wide spectrum of wavelengths, including sensitive wavelengths. For example, an embodiment provides for portion 17 to cover about 25% or less of each lens.

Figure 4A:
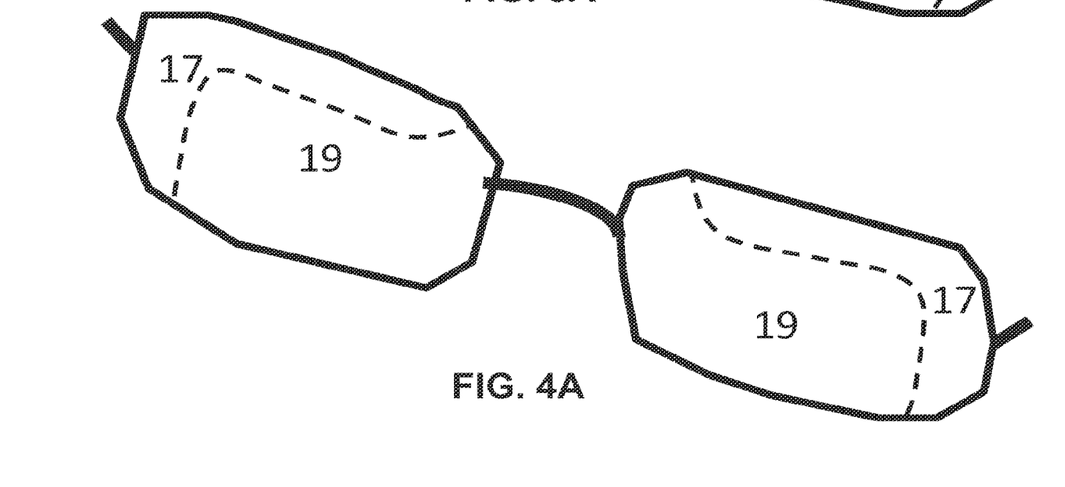
FIG. 4A is an illustrative view of eyeglasses with lenses according to an embodiment of inventive concepts.
Figure 4B:
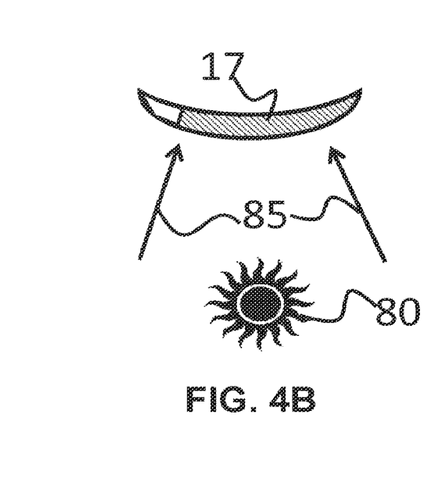
FIG. 4B is an illustrative schematic top perspective view of light directed to a lens according to the embodiment of FIG. 4A.

FIG. 4A is an illustrative view of eyeglasses with lenses according to an embodiment of inventive concepts. FIG. 4B is an illustrative schematic top perspective view of light directed to a lens according to the embodiment of FIG. 4A. A portion of the lens 17 targets absorption of selected wavelengths in the top and rightmost portions of the right eye and the top and leftmost portions of the left eye, which can enhance absorption of the sensitive wavelengths in these more sensitive portions of the eye. Exemplary light traces 85 emanating from surroundings, including the sky within which the sun 80 and atmosphere generate a wide spectrum of wavelengths, including sensitive wavelengths. In an embodiment, the eyewear is configured to enhance the effects from "bright light boxes," meant to mimic the effects and output of the sun with respect to the sensitive wavelengths. Many of these light boxes direct light from a lower or more horizontal position with respect to the observer, wherein an embodiment such as shown in FIG. 4A could accentuate the effects. For example, an embodiment provides for portion 17 to cover about 50% or less of each lens.

Figure 5A:
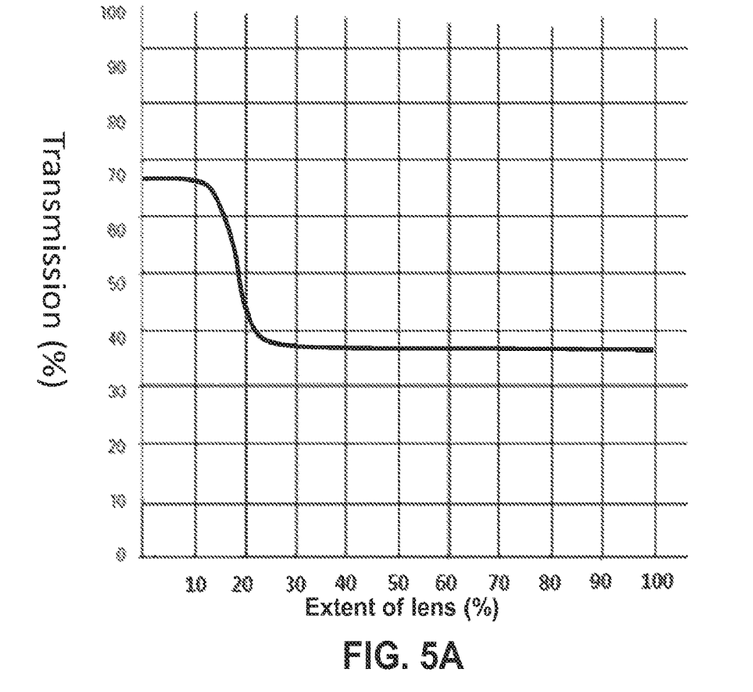
FIG. 5A is a graphical illustration showing a transmission profile of a wavelength over the extent of a lens according to an embodiment of inventive concepts.
Figure 5B:
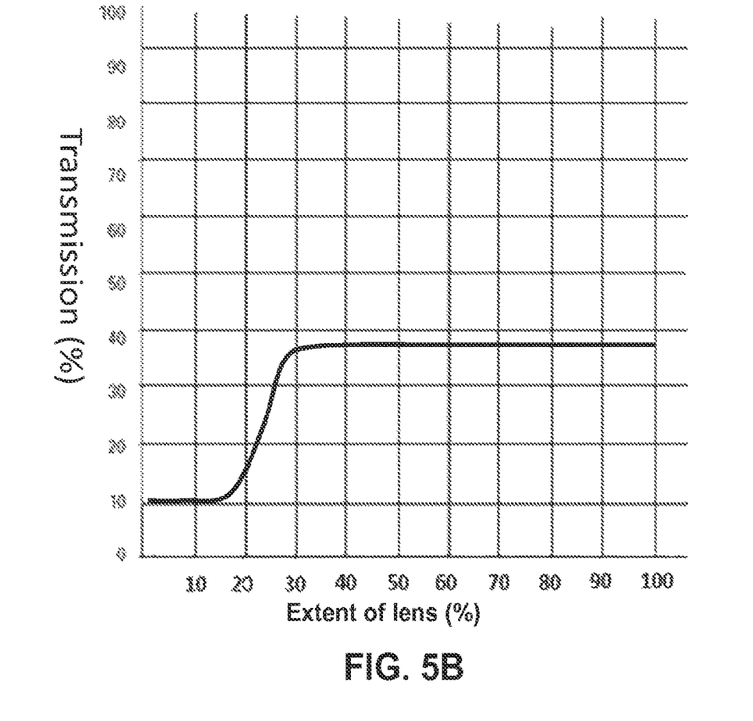
FIG. 5B is a graphical illustration showing another transmission profile of a wavelength over the extent of a lens according to an embodiment of inventive concepts.

FIG. 5A is a graphical illustration showing a transmission profile of a wavelength over the extent of a lens according to an embodiment of inventive concepts. In an embodiment, a wavelength or range of wavelengths including, for example, sensitive wavelengths, can have a transmission profile across the extent of a lens starting with the leftmost portion of a left-side lens, rightmost portion of a right-side lens, and/or top-side portion of the lens. The maximum transmission/throughput levels, e.g. close to 70%, are proximate to these positions and decrease and are lowered for a large segment of the remaining extent of the lens. In an embodiment, the remaining transmitted wavelengths follow a transmission profile such as illustrated in FIG. 5B, wherein the maximum and lowered transmission/throughput levels are substantially inversed in comparison to sensitive wavelengths according to FIG. 5A. Such a profile can be implemented according to, for example, the embodiments shown in FIGS. 1C, 3A-B, 4A-B, and FIG. 6 which demarcate transition zones where the decrease/increase can occur.

Figure 6:
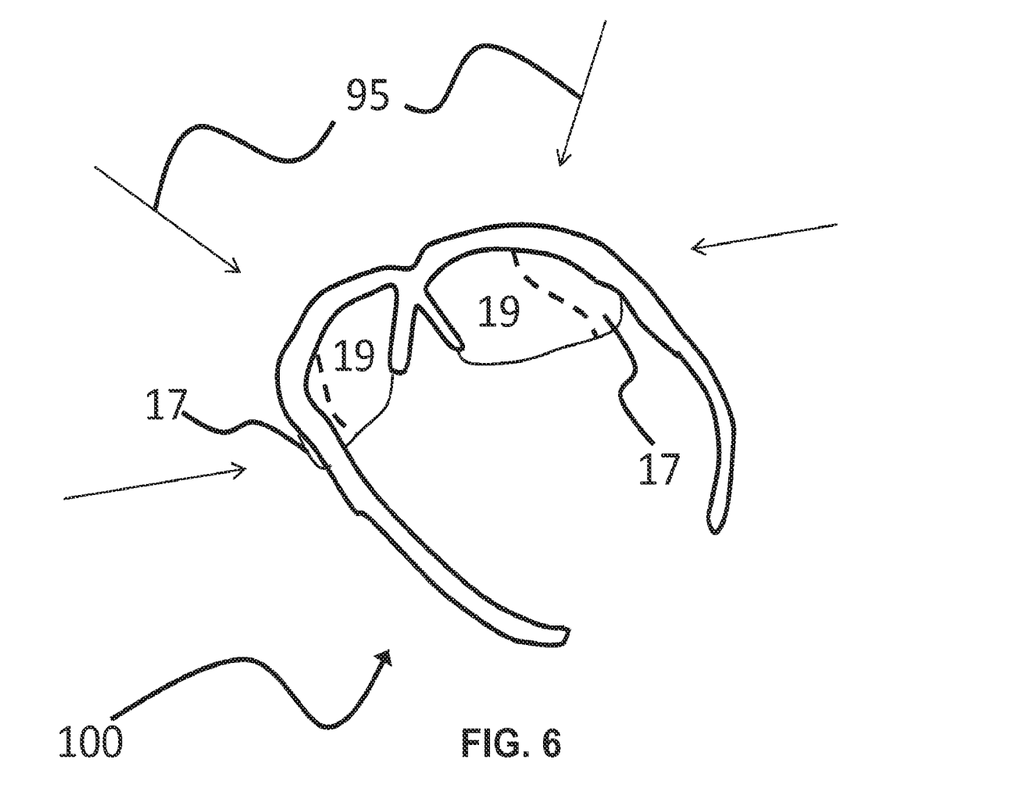
FIG. 6 is an illustrative schematic view of eyeglasses with lenses according to an embodiment of inventive concepts.
Figure 7:
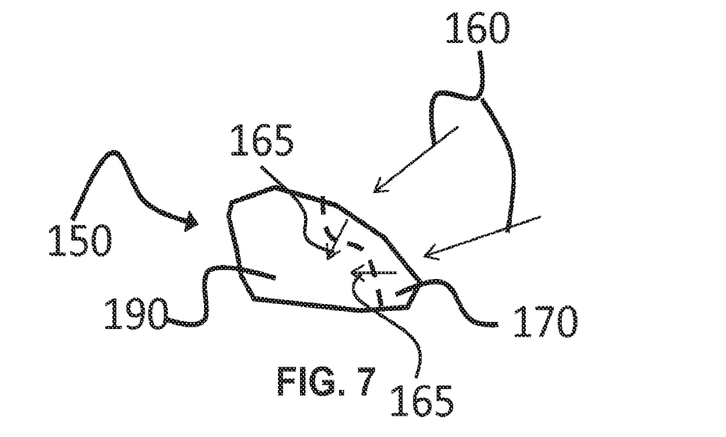
FIG. 7 is an illustrative schematic view of a lens incorporating optics for redirecting impinging light according to an embodiment of inventive concepts.

FIG. 6 is an illustrative schematic view of eyeglasses with lenses according to an embodiment of inventive concepts. Eyewear with lenses according to those described herein can be manufactured in a wrap-around style configuration which limit the amount of light, e.g., sample light traces 95, impinging the eye that does not first pass through the lenses. In an embodiment, the lenses have a configuration with portions 17 and 19 such as described previously herein. In an embodiment, such as shown in FIG. 7, a lens 150 incorporating optics 170 for redirecting impinging light (e.g., light traces 160 redirected to light traces 165) can be employed. In an embodiment, the impinging light is redirected towards portions of the eye more sensitive to sensitive wavelengths, while being filtered to accentuate the sensitive wavelengths such as described herein in various embodiments. The redirection can be configured, for example, with parabolic type concentrating optics and/or use of layers with refractive indices configured to redirect the impinging light. In an embodiment, a distinct portion 190 can be configured to direct and filter light in a more traditional manner to improve clarity and protect the wearer from harmful rays.

It will be understood by those with knowledge in related fields that uses of alternate or varied forms or materials and modifications to the methods disclosed are apparent. This disclosure is intended to cover these and other variations, uses, or other departures from the specific embodiments as come within the art to which the invention pertains. Each of the references identified above are herein incorporated by reference in their entirety.

I claim:

1. An eyewear lens adapted with one or more subregions of the eyewear lens having a greatest percentage transmissivity level of visible light through the one or more subregions of the eyewear lens within a wavelength range of between about 400 and 490 nanometers, the one or more subregions of the eyewear lens arranged to direct light to a mood-sensitive portion of an eye of a wearer, and
   wherein the eyewear lens is adapted with a portion distinct from the one or more subregions of the eyewear lens, said portion having a greatest percentage transmissivity level of visible light outside of the wavelength range of between about 400 and 490 nanometers.

2. The eyewear lens of claim 1 wherein the one or more subregions of the eyewear lens are adapted with a greatest percentage transmissivity level of visible light through the one or more subregions of the eyewear lens at a peak wavelength of about 470 nanometers.

3. The eyewear lens of claim 1 wherein the one or more subregions of the eyewear lens comprise a bandpass filter adapted to provide a greatest percentage transmissivity level of visible light through the one or more subregions of the eyewear lens within a wavelength range between about 400 and 490 nanometers.

4. The eyewear lens of claim 1 wherein the one or more subregions of the eyewear lens are limited to subregions about a frame edge of the eyewear lens.

5. The eyewear lens of claim 4 wherein the one or more subregions are limited to at least one or more of a leftmost portion of a left side of the eyewear lens, a rightmost portion of a right side of the eyewear lens, and a topside portion of the eyewear lens.

6. The eyewear lens of claim 5 wherein the one or more subregions of the eyewear lens cover in total at most 25% of the eyewear lens.

7. The eyewear lens of claim 5 wherein the one or more subregions of the eyewear lens cover in total at most 50% of the eyewear lens.

8. The eyewear lens of claim 1 wherein the eyewear lens is polarized.

9. The eyewear lens of claim 1 wherein the greatest percentage transmissivity level of visible light through the one or more subregions of the eyewear lens within the wavelength range between about 400 and 490 nanometers is at least about 70% and wherein the one or more subregions of the eyewear lens are adapted with a greatest percentage transmissivity level of visible light outside of the wavelength range between about 400 and 490 nanometers of less than about 70%.

10. The eyewear lens of claim 9 wherein the greatest percentage transmissivity level of visible light through the one or more subregions of the eyewear lens within the wavelength range between about 400 and 490 nanometers is at least about 80%.

11. The eyewear lens of claim 9 wherein the greatest percentage transmissivity level of visible light through the one or more subregions of the eyewear lens of visible light outside of the wavelength range between about 400 and 490 nanometers is less than about 50%.

12. The eyewear lens of claim 9 wherein the greatest percentage transmissivity level of visible light through the one or more subregions of the eyewear lens of visible light outside of the wavelength range between about 400 and 490 nanometers is less than about 50% of the greatest percentage peak transmissivity level of the passage of visible light through the one or more subregions of the eyewear lens within the wavelength range between about 400 and 490 nanometers.

13. The eyewear lens of claim 1 wherein the eyewear lens is adapted with a greatest percentage transmissivity level of light through the eyewear lens within the wavelength range of about 380 nm and less than about 380 nm is about 0%.

14. The eyewear lens of claim 1 further comprising a fluorescent material adapted to increase an output of light of a wavelength between 400 and 490 nanometers from the eyewear lens to a wearer of the eyewear lens.

15. The eyewear lens of claim 1 wherein the one or more subregions of the eyewear lens are adapted with a greatest percentage transmissivity level of sunlight that is within a wavelength range of between about 400 and 490 nanometers.

16. The eyewear lens of claim 1 wherein said portion distinct from the one or more subregions of the eyewear lens is adapted with a greatest percentage transmissivity level of visible light of greater than about 490 nanometers.

17. The eyewear lens of claim 1 wherein said portion distinct from the one or more subregions of the eyewear lens is adapted with a greatest percentage transmissivity level of visible light of about 650 nanometers.

18. The eyewear lens of claim 1 wherein the one or more subregions of the eyewear lens are adapted to provide at least 200 lux of luminance of light within the range of 400 and 490 nanometers when used in sunlight.

\* \* \* \* \*